United States Patent [19]
England

[11] 4,040,208
[45] Aug. 9, 1977

[54] PLANT HOLDER AND ANCHOR FOR ORCHID PLANTS AND THE LIKE

[76] Inventor: Fred England, 307 SW. Hardin Lane, Palm Bay, Fla. 32905

[21] Appl. No.: 620,547

[22] Filed: Oct. 8, 1975

[51] Int. Cl.² ............................................. A01G 9/02
[52] U.S. Cl. ..................................... 47/67; 47/70
[58] Field of Search .................. 47/34, 35, 39, 44–47, 47/70, 67; 294/27–33; 220/95; 24/261 B; 16/110.5, 110 A, 110 R, 114, 120, 125; 224/45 R, 45 AA, 45 P, 45 T, 45 W, 46 T, 48 W; 248/317, 318

[56] References Cited

U.S. PATENT DOCUMENTS

| | | | |
|---|---|---|---|
| 294,289 | 2/1884 | Timberlake | 294/33 |
| 1,180,941 | 4/1916 | Phelps | 16/125 |
| 2,331,397 | 10/1943 | Hummel | 47/47 |
| 2,893,169 | 7/1959 | Shepherd | 47/47 |
| 2,956,370 | 10/1960 | Wieboldt | 47/35 X |
| 3,053,010 | 9/1962 | De Shazor, Jr. | 47/34 |

*Primary Examiner*—Ralph T. Rader
*Assistant Examiner*—James R. Feyrer
*Attorney, Agent, or Firm*—Duckworth, Hobby, Orman, Allen & Pettis

[57] ABSTRACT

A flower pot of the type having a cavity therein and a top opening communicating with the cavity and peripheral holes at the bottom thereof is provided with a rigid wire member extending along the side of the cavity and through the holes, the wire member having a generally U-shape with a bridging portion across the top thereof for anchoring the plant above the top opening of the pot.

4 Claims, 1 Drawing Figure

PLANT HOLDER AND ANCHOR FOR ORCHID PLANTS AND THE LIKE

BACKGROUND OF THE INVENTION

1. Field of the Invention

The present invention relates to holders and anchors for plants, and in particular for such arrangements adapted for use with flower pots in which an orchid or similar plant is growing or is to be grown.

2. Description of the Prior Art

If certain types of plants, notably the cattleya orchid plant, are not staked or hold in an upright position, these plants grow vertically and horizontally in a random fashion. As a result, the plant has a unkempt appearance, may encroach into adjoining plants or take up excessive space. Additionally, the flowers may grow upside down, or may be damaged or open within the foliage. Further, any new growth within the pseudobulbs, leaves and flowers may break over causing the new growth to die.

There is presently commercially available two types of holders for orchid plants and the like. The first arrangement constitutes a straight, single wire stake to which the leaves are wired to tied. The second arrangement includes a straight wire stake and a circle at the top thereof, the top adapted to encircle the leaves of the plant. Both such arrangements are adapted to clip onto the top limb of the flower pot. However, the thickness of the rim of flower pots varies substantially, especially as between clay pots and the now widely commercially used plastic pots.

Additionally, orchid plants, such as the cattleya orchid, are frequently divided and repotted and must be anchored on the top of the potting mix. At present, there is commercially available a clip adapted to engage the top rim of the pot in order to hold the rhisome down. However, because commercially available plastic pots are thinner and more flexible, such clips do not work well and occassionally break or otherwise damage the pot.

In the prior art, there are disclosed various techniques for hanging flower pots and/or for providing means for holding the plant above the pot. Examples of such arrangements are shown in the following U.S. Pat. Nos. 3,224,144 to Muennich; 1,249,973 to Lutey; 1,756,461 to Hanson; 3,013,758 to Smith and Design Patent No. 186,454 to Averhard.

SUMMARY OF THE INVENTION

The present invention contemplates the combination of a flower pot having a cavity therein and a top opening communicating with the cavity, the cavity and the opening adapted to receive a plant to be carried by the pot. The pot includes at least two peripheral holes adjacent the bottom thereof, with a rigid wire member extending along the sides of the cavity and through the holes, the wire member including means for anchoring the plant above the opening.

THE DRAWING

The single FIGURE of the drawing is a cross-sectional side view of a combined pot, plant and anchor in accordance with the present invention.

DETAILED DESCRIPTION

Figure 1:
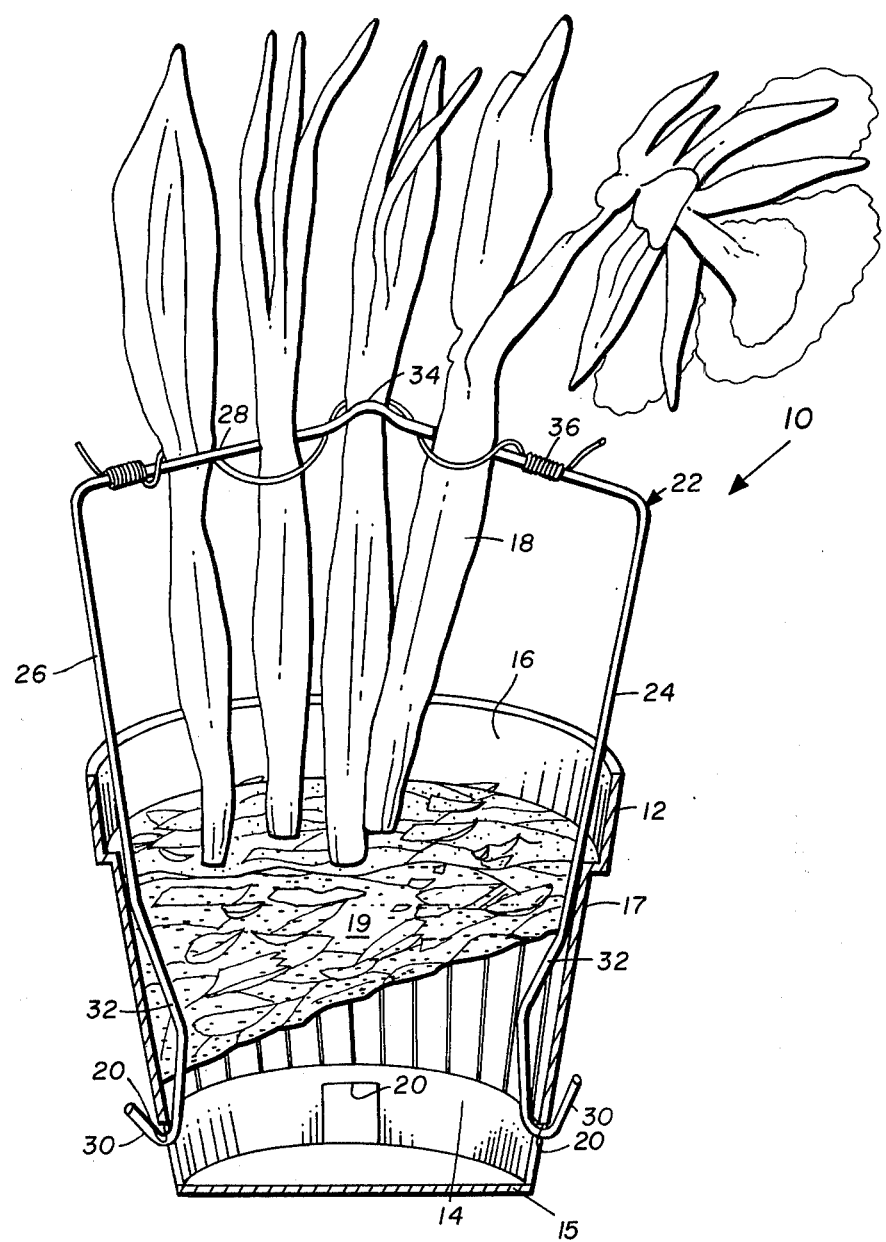

A preferred embodiment of an arrangement in accordance with the present invention will be described with reference to the drawing.

The combination of the flower pot, plant and plant anchor in accordance with the present invention is referred to generally as 10 in the drawing. The combination 10 includes a pot 12 having an internal cavity 14 defined by a bottom 15, a curved side wall 17, a top opening 16 and peripheral holes 20 adjacent the bottom in the side thereof. The pot 12 may comprise any one of a variety of commercially available clay or plastic pots. However, plastic pots are particularly suited for the present invention.

A plant, such as the orchid plant 18 shown in the drawing, is held in the pot 12 in conjunction with an amount of potting mix 19. A portion of the potting mix is shown removed in the drawing, in order to more clearly illustrate the present invention.

In accordance with the present invention, a rigid wire member 22 is provided having a U-shaped figuration defined by two arms 24, 26 and a bridging portion 28 between the two arms. Each arm 24, 26 includes a hook 30 at the extremity thereof which loops through a corresponding one of the peripheral holes 20 such that the corresponding arm 24, 26 engages the side 17 of the pot 12. Each arm 24, 26 also includes a bend 32 in that portion of the arm which extends through the soil 19, to cause a portion of each arm to be biased, i.e. spring-tensioned, against the side 17 of the pot 12.

The bridging portion 28 of the rigid wire member 22 includes a bend 34 from which the entire combination 10 may be suspended. The plant 18 may be anchored to the wire member 22 by employing string or wire 36 wrapped around the plant 18 of the bridging portion 28.

The combination 10 thus described above provides an arrangement which is capable of rigidly holding and anchoring an orchid plant above the top opening 16 of the pot 12. Preferably, the arms 24, 26 of the wire member 22 are dimensioned such that the bridging portion 28 is positioned approximately 5 inches above the top opening 16 when the wire member 22 is installed within the pot 12. Additionally, the wire member 22 provides means by which the entire combination 10 can be suspended.

I claim:

1. In combination:
   a flower pot having a cavity therein defined by a bottom, a side wall and a top opening communicating with said cavity, said cavity and said opening adapted to receive a plant to be carried by said pot, said pot having opposing peripheral holes in said side wall at the interface between said side wall and said bottom;
   a generally U-shaped wire member having two arms with an outwardly turned hook at the extremity of each said arm, each hook engaging said pot through one of said peripheral holes;
   a bend along each of said arms of said U-shaped wire member between the periphery of said top opening and said bottom for biasing the corresponding arm against the inside of said side wall of said pot; and
   a bridging portion of said U-shaped wire member between said two arms thereof, said two arms having a dimension so as to allow said bridging portion to extend above said top opening when said wire member is installed in said pot, whereby said plant therein may be anchored to said bridging portion.

2. The combination recited in claim 1 further comprising means for suspending said pot and said plant anchor.

3. The combination in accordance with claim 2 wherein said suspending means comprises a bend in said bridging portion at a central location thereof.

4. The combination recited in claim 1 wherein said two arms are dimensioned such that said bridging portion extends 5 inches above said top opening when said wire member is installed.

* * * * *